United States Patent [19]

Sonnenberger

[11] Patent Number: 4,581,631
[45] Date of Patent: Apr. 8, 1986

[54] CIRCUIT ARRANGEMENT FOR ENHANCING THE SHARPNESS OF VIDEO SIGNAL EDGES

[75] Inventor: Paul Sonnenberger, Hamburg, Fed. Rep. of Germany

[73] Assignee: U.S. Philips Corporation, New York, N.Y.

[21] Appl. No.: 507,831

[22] Filed: Jun. 24, 1983

[30] Foreign Application Priority Data

Jun. 24, 1982 [DE] Fed. Rep. of Germany ....... 3223580

[51] Int. Cl.[4] .......................... H04N 9/64; H04N 5/14; H04N 5/208
[52] U.S. Cl. ........................................ 358/37; 358/166
[58] Field of Search ..................... 358/37, 166, 40, 38; 328/135, 151; 307/268

[56] References Cited

U.S. PATENT DOCUMENTS 4,296,433 10/1981 Rzeszewski ........................ 358/37

Primary Examiner—James J. Groody
Assistant Examiner—Michael P. Dunnam
Attorney, Agent, or Firm—Thomas A. Briody; William J. Streeter; Edward W. Goodman

[57] ABSTRACT

In order to enhance the sharpness of edges, the incoming video signal, for example a color-difference signal, is stored upon the occurrence of an edge until the end of the transition with the value occuring before the edge appeared. The transition interval is determined in that the video signal is differentiated and passed through a threshold device. At the end of the transition interval, a change-over is effected to the new signal value.

6 Claims, 3 Drawing Figures

CIRCUIT ARRANGEMENT FOR ENHANCING THE SHARPNESS OF VIDEO SIGNAL EDGES

BACKGROUND OF THE INVENTION

The invention relates to a circuit arrangement for enhancing the sharpness of edges in a video signal, in particular a chroma signal or a color-difference signal, in which an input of the circuit arrangement is coupled to an output of the circuit arrangement by means of at least one switch and in which the input is coupled to a switching-signal generator for the generation of a switching signal for the actuation of the switch, so that during the occurrence of edges, the coupling between the input and the output is interrupted by means of the switch, the circuit arrangement comprising a memory for the amplitude of the video signal at the beginning of an edge.

When a signal with a steplike transition between two amplitude values is applied to a color-signal transmission channel, the limited bandwidth gives rise to a transition with a certain slope. This results in a transition interval between the initial value and the final value, which interval has a specific width which is largely independent of the magnitude of the amplitude step. This width depends on the frequency bandwidth of the color-signal transmission channel and may therefore have different values, for example, in different types of TV-sets.

In a circuit arrangement of the type mentioned in the opening paragraph as disclosed in DE-AS 15 62 170, a switching signal is derived from edges of a video signal, by means of which switching signal, it is achieved that upon the appearance of a sloping transition between two video-signal values, the signal value existing before the transition interval is stored directly and after a delay of half the width of the transition interval, the signal value which occurs after the transition interval is transferred to the memory and, via a switch arranged before the output terminal, to the output. In the known circuit arrangement the insertion of the signal values with steep transitions in the range in which the incoming signal has only a finite slope owing to the limited frequency bandwidth, is started by a pulse signal which occurs at the beginning of the transition interval and is controlled by means of delay lines.

The known circuit arrangement requires the use of a plurality of switches and, in particular, delay lines, which must be proportioned in conformity with the width of the transition interval. Since the interval width depends on the frequency bandwidth, which in its turn depends on the design of the entire signal transmission channel, the delays of the delay means used must be variable or adjustable. Therefore, the known circuit arrangement is either intricate or a compromise, which cannot yield optimum results.

SUMMARY OF THE INVENTION

It is the object of the invention to simplify the circuit arrangement and in particular to make it suitable for the use of integrated-circuit technology.

According to the invention this is achieved in that the memory is coupled permanently to the output.

In a further embodiment of the invention the switching signal is obtained in that the video signal is differentiated in a differentiation stage and is subsequently rectified, after which the resulting modifying signal is applied to a clipping stage which transfers only approximately maximum values and which generates the switching signal. Thus, it is ensured that the switching signal occurs only when an amplitude variation with an at least approximately maximum slope appears in the video signal, as in the case of a step in the original signal.

Preferably, the video signal is applied directly and via an integration network to the inputs of a differential amplifier, whose two oppositely directed output signals are each applied to a rectifier which combines the portions which are similarly oriented, for example positive-going, so that independently of the direction of the variation, a signal is obtained which is proportional to the magnitude of the variation, the integration time constant being smaller than, preferably small relative to, the transition-interval width.

In said differential amplifier, the integration network forms the difference between an instantaneous signal value and a signal value occurring briefly before it, so that an output signal is obtained which corresponds to the slope or differential quotient of the chrominance signal. The rectification ensures that the output signal becomes independent of the sign and corresponds to the value without said sign. As a result of this video signal steps towards higher and lower amplitude values are processed in the same way.

In a further advantageous embodiment of the invention the switching signal is applied to the inputs of a differential amplifier both directly and via an integration network, the switch being controlled by the output signal of said differential amplifier and the integration time constant being of the order of magnitude of the transition-interval width. This ensures that upon the occurrence of the trailing edge of the switching signal, the change-over in the differential amplifier is effected with a steeper edge, so that the resulting switching signal has sharp edges on both sides.

DESCRIPTION OF THE DRAWINGS

Embodiments of the invention will now be described in more detail, by way of example, with reference to the drawings, in which.

DESCRIPTION OF THE PREFERRED EMBODIMENT

Figure 1:
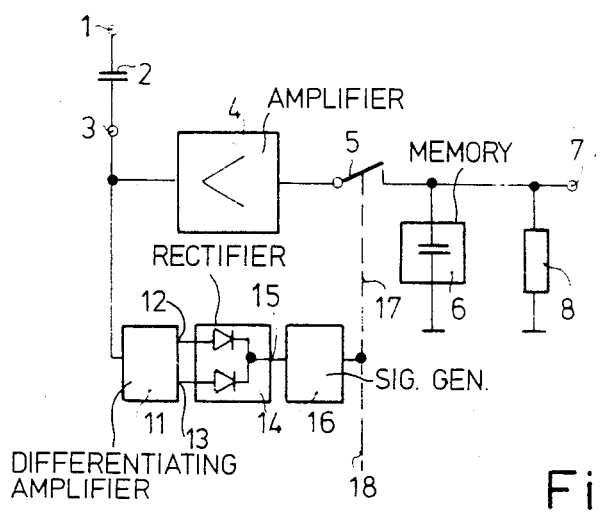
FIG. 1 is a block diagram of the arrangement in accordance with the invention.

In the circuit of FIG. 1 an incoming video signal, for example the color-difference signal (R-Y) or (B-Y) which has been demodulated from a chrominance carrier in a TV receiver, is applied from an input terminal 1 to a circuit point 3 via a capacitor 2 and then to a, preferably electronic, switch 5 via an amplifier 4. This switch 5 is normally closed, so that the incoming color difference signal is applied to a memory 6, whose other side is connected to ground, and to an output terminal 7. The memory may be a small capacitor which is charged by the color difference signal supplied by the amplifier 4 and which, via the terminal 7, is loaded by a high impedance 8, for example the input impedance of a differential amplifier.

Moreover, the input signal from point 3 is applied to a differentiating amplifier 11, which comprises two output terminals 12 and 13 on which the differentiated signals derived from the input signal appear with opposite directions of variation. These signals are applied to a full-wave rectifier 14 in such a way that the differentiated signal portions having the same direction of variation relative to an average value appear on its output 15.

Figure 2:
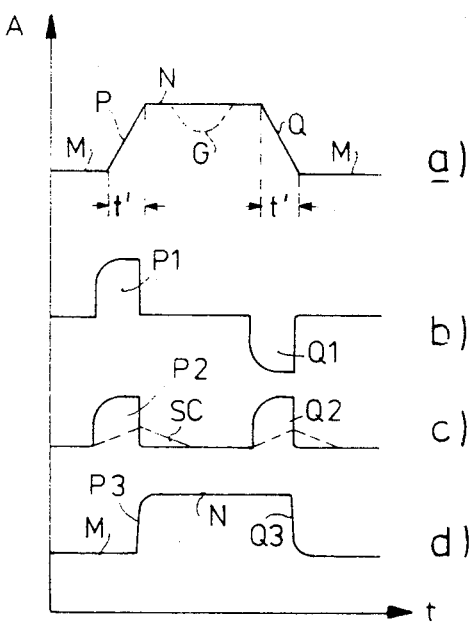
FIG. 2 shows time diagrams of signal waveforms occurring in the circuit arrangement in accordance with the invention.

The signal applied to the amplifier 11 in FIG. 1 may be a signal as shown in FIG. 2a, for example a color-difference signal, which varies in time from a low value M to a higher value N, after which it changes again to the value M. The transition between the values M and N will generally be step-like in an original picture. However, as a result of the limited frequency band of the signal transmission channel, transitions P and Q with a limited finite slope will occur between the amplitude levels M and N. As a result of this slope, the transitions P and Q occupy a time interval t'. The originally sharp color transition is thus more gradual and gives rise to an unsharp portion in the reproduced picture.

In the differentiating stage 11, the signal variation as shown in FIG. 2a is modified so that a differentiated signal as shown in FIG. 2b is obtained. At the location where the signal values M and N remain constant, this differentiated signal has the value zero- or another fixed value determined by the circuit. At the location where the amplitude varies slowly as a result of the picture content—indicated by broken lines at G in FIG. 2a—small amplitude variations G occur in the differentiated signal. During the amplitude variations P and Q maximum pulse-like amplitude steps P1 and Q1, respectively, occur in the differentiated signal, the signal P1 being positive-going and the signal Q1 being negative-going relative to the average value, in conformity with the variation of the color-difference signal. As the change-over necessary for enhancing the sharpness must be independent of the sign of the amplitude variation, the signals with opposite amplitude variations appearing on the two outputs 12 and 13 of the differentiating stage 11 are rectified in the rectifier 14 in such a way that a transition signal as shown in FIG. 2c appears on the output 15. Thus, the pulse-like signals P2 and Q2 corresponding to the transitions will vary in the same direction relative to the neutral value, each with the interval width t'. Since only originally step-like steep transitions must be processed, the rectifiers in the stage 14 are followed by a threshold device, which inhibits the passage of signal corresponding to a small variation, such as Q1 in FIG. 2b.

The signal thus obtained on the output 15 of the stage 14 is applied to a switching-signal generator 16, which, as indicated in FIG. 1 by the broken line 17, supplies a switching signal which opens the switch 5 when a transition signal P2 or Q2 appears.

In the present circuit arrangement, the signal applied to terminal 1, optionally after amplification, is normally applied to the output terminal 7 and consequently to the input impedance 8 of a following circuit. Via an amplifier 4 with a low internal resistance, it is simultaneously applied to a memory 6 which is connected to the output terminal 7, the signal across the memory 6 normally varying continually in conformity with the incoming signal.

When a transition P or Q (see FIG. 2a) appears in the incoming signal, the circuit 11–16 described above will open the switch 5 by means of the switching signal 17. The signal on the output terminal 7 then no longer varies in accordance with the continually rising and falling sloped section P, but rather the amplitude value M occurring before this transition interval is held by the memory 6 and applied to the output terminal 7. The switching signal 17 is not terminated until the transition interval t' has ended, and the signal on output 7 then changes almost instantaneously to the value N of the input signal in conformity with the short switching time of the switch 5. Thus, the variation of the signal on output terminal 7 will be as shown in FIG. 2d, the color transition on the edge P3 or Q3 being distinctly steeper than in the original signal shown in FIG. 2a.

In the original signal, the color step is situated approximately at the beginning of the edge P and is then expanded in time towards the back. If, in addition to the chrominance amplitude step, a luminance step occurs, the latter will be situated approximately at the beginning of the sloping portion P in FIG. 2a, while the color step has shifted towards the end of the transition edge P in FIG. 2d. In order to bring the color step, in accord with a luminance step the luminance signal, in accordance with the invention, is delayed accordingly. For different reasons a conventional television receiver already contains an element producing a delay of, for example 400 ns in the luminance channel. In a circuit arrangement in accordance with the invention, a further delay of approximately 400 ns is required, that is, for example 800 ns in total.

This normal and this additional delay in the luminance channel depend on the design of the entire circuitry and must be selected in conformity with the type of receiver. This may also be achieved with integrated circuit technology if the luminance delay line is formed by means of a gyrator circuit and the delay is adjusted to the desired value by means of a resistor which is external to the integrated circuit.

A further adjustment of time intervals is not necessary in the circuit arrangement in accordance with the invention. The switching edges of the switching pulses shown in FIG. 2c are derived directly from the incoming signal and are therefore shifted automatically towards longer or shorter intervals, if the circuit arrangement in accordance with the invention is built into a color television receiver or the like.

Normally at least two color signals, preferably color-difference signals, are transmitted. A switching signal for the switch 5 must also be actuated when a steep color transition occurs in at least one other color signal. Therefore, it is effective to interlock the switching signals from different switching signal generators 16, as is indicated by the broken line 18. This ensures that all color edges appear at the same location, which gives the impression of an improved color sharpness.

Figure 3:
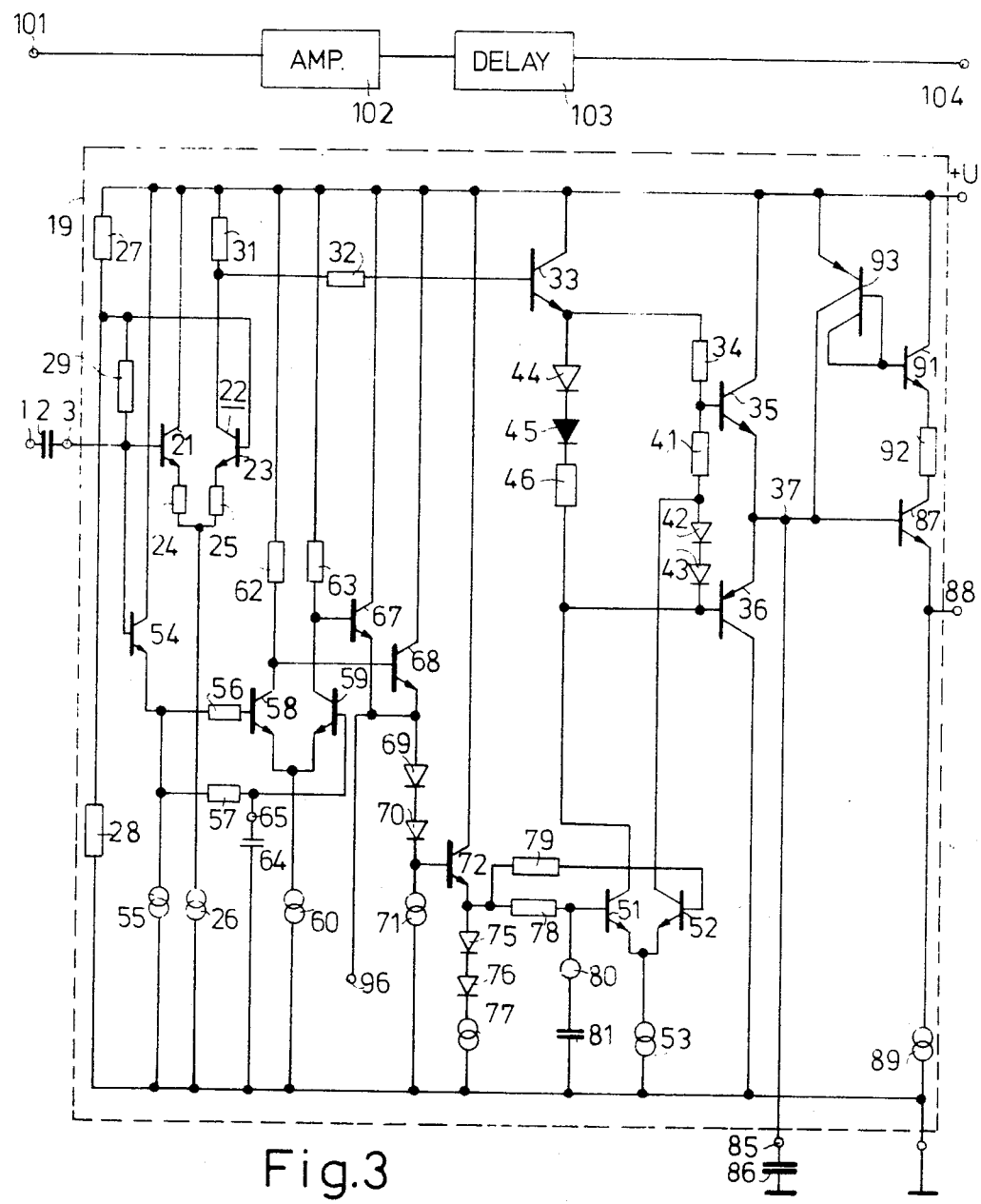
FIG. 3 is a more detailed circuit diagram of the arrangement in accordance with the invention.

FIG. 3 shows a circuit arrangement as shown in FIG. 1 in more detail.

In the arrangement of FIG. 3 the red color-difference signal from the input terminal 1 is applied, via the isolating capacitor 2, to an input 3 of an integrated circuit indicated by the broken bounding line 19. This input 3 is connected to the first base input of an npn-transistor 21 in a differential amplifier 22, which also comprises a second npn-transistor 23. The emitters of the transistors 21 and 23 are connected to ground via a resistor 24 of 3.3 kohms and a resistor 25 of 3.6 kohms, respectively, and via a current source 26 supplying a current of 0.67 $\mu$A. Between the power supply source +U and ground, a voltage divider comprising the impedances 27 and 28 is arranged, of which one impedance and/or the other may at least partly be formed by a transistor, for example, arranged as a current source.

The tapping of the voltage divider 27, 28 is connected directly to the base of transistor 23 and to the base of transistor 21 via an intermediate resistor 29 of 12 kohms.

The collector of the transistor 21 is connected directly to +U, which carries 12 V. In the collector circuit of transistor 23 a load resistor 31 of 7.3 kohms is arranged, across which the input signal which has been amplified in the differential amplifier 22 appears. Via a parallel resistor 32 of 8 kohms, this signal is applied to the base of an npn emitter-follower transistor 33, whose collector is connected to +U. Via a 4.8 kohm resistor 34, the emitter of the transistor 33 drives the base of an npn transistor 35, whose collector is connected to +U and whose emitter is connected to the emitter of an npn transistor 36 whose collector is grounded. The transistors 35 and 36 are arranged as a push-pull amplifier, whose output signal appears on point 37. The base of transistor 36 is driven by the signal applied to the base of transistor 35, via a 160-ohm resistor 41 which is arranged in series with two diodes 42 and 43. The circuit elements 41, 42 and 43 ensure that amplifier 35, 36 is driven so as to provide a continuous output.

The series arrangement of two diodes 44 and 45 and a 4.8 kohm resistor 46 is arranged in the emitter circuit of the transistor 33 in parallel with the series-connected resistors 34 and 41 and the diodes 42 and 43.

The junction point of the two parallel emitter circuits which is remote from the transistor 33 and the junction point of the resistor 41 and the diode 42 are each connected to the respective collectors of two npn transistors 51 and 52 whose interconnected emitters are connected to ground via a current source 53. As indicated by the connection 17 in FIG. 1, these transistors 51, 52 supply the control signal with which the push-pull transistors 35 and 36, which correspond to the switch 5 in FIG. 1, are rendered inoperative.

For controlling this switch, the input signal from point 3 is applied to the base of an npn transistor 54, whose collector is connected to +U and whose emitter is connected to ground via a current source 55 which acts as a load resistor. Thus, the transistor 54 operates as an emitter follower, which, via the 100-ohm resistors 56 and 57 drives the bases of the npn-transistors 58 and 59, respectively, whose emitters are interconnected and connected to ground via a current source 60. The transistors 58 and 59 are arranged as a differential amplifier, in whose collector circuits load resistors 62 and 63, respectively, are arranged, which resistors are connected to power-supply source +U.

Moreover, via a 220 pF capacitor 64, the base of the transistor 59 is connected to ground. In view of its size, this capacitor is preferably arranged outside the integrated circuit, for which purpose a terminal 65 may be used, which terminal is connected to the base of the transistor 59. With the capacitor 64 and, in particular, the series resistor 57, an integration network is formed, by means of which the signal from transistor 54 is transferred to the base of transistor 59 with a delay of a few picture elements. The differential amplifier 58, 59 thus receives two signals, of which the signal on the base of transistor 58 corresponds to the instantaneous color signal and that on the base of transistor 59 to the color signal which appeared slightly earlier. In this way, a difference in time between the amplitude values arises, which result in a differentiation. The output signal of the differential amplifier 58, 59 is consequently proportional to the slope of the applied color signal. As already stated, this slope is limited by the frequency bandwidth of the preceding transmission channel and the maximum value occurs if the transmitted picture originally contained a sharp color transition whose slope has been reduced by the transmission channel. Depending on whether a transition to a larger or a smaller color value occurs (see FIG. 2a), a higher voltage will appear on the collector of the transistor 58 or the collector of the transistor 59. These collectors are connected to the bases of npn transistors 67 and 68 respectively, whose collectors are connected to the power supply +U and whose emitters are commoned and are connected to ground via two diodes 69 and 70, poled in the forward direction, and a current source 71. When the opposite drives on the bases of the transistors 67 and 68 are small, a difference will occur between the base voltages of the transistors 67 and 68, but the absolute value will hardly change so that the voltage on the emitters of the transistors 67 and 68 and thus on the cathode of the diode 70 hardly changes. Therefore, the drive to a following npn emitter-follower transistor 72, whose collector is connected to the power supply +U and whose base is connected to the cathode of the diode 70, will not vary. Via the series arrangement of two diodes 75 and 76 poled in the forward direction and a current source 77, the emitter circuit of transistor 72 is connected to ground. Via the parallel resistors 78 and 79, the emitter voltage is applied to the bases of the transistors 51 and 52, respectively. Between the base of the transistors 51 and ground, a 330 pF capacitor 81 is arranged, if necessary via an external terminal 80.

As long as the variations in the incoming color signal are only small, the voltage on the commoned emitters of the transistors 67 and 68, and consequently on the base of the transistor 72, will not vary. The voltages on the bases of the transistors 51 and 52 are then substantially equal, and the currents in the two transistors are each equal to substantially half the current from the source 53. This means that currents flow in the emitter circuits of the transistor 33 and the color signal applied to the base of transistor 33 is transferred to the transistors 35 and 36 to drive these transistors.

However, if the color signal exhibits a steeper transition corresponding to P or Q in FIG. 2a, the signal which has been differentiated in the stage 59 has a maximum value. The bias, in particular by the source 71, is such that one of the transistors 67 and 68 is then turned off. The other transistor then operates as an emitter-follower and the increasing voltage on its base is applied to the transistor 72. Since the transistors 67 and 68 are arranged symmetrically, a positive voltage-pulse will appear on the base of transistor 72 depending on whether the transition in the color signal is towards a larger or a smaller value. Thus, the transistors 67 and 68 operate as a full-wave rectifier. Transistor 52 is turned on upon the leading edge of this pulse, the voltage on the base of transistor 51 being maintained for the time being by means of the capacitor 81. The current through the transistor 52 increases, so that the base voltage of the transistor 35 is shifted towards less positive values and the base-emitter voltage of the transistor 35 becomes negative, causing this transistor to be cut off. As a result of the operation as a differential amplifier, the collector current of the transistor 51 decreases, its collector voltage increases and the base-emitter voltage of the transistor 36 also becomes positive. The amplifier 35, 36 is then cut off.

The circuit point 37 in the output of the amplifier 35, 36 is also connected to an external terminal 85, to which a 1-nF storage capacitor 86 is connected. During normal operation, the amplifier 35, 36 has such a low output impedance that the charge on capacitor 86 is adapted to the instantaneous signal value without affecting the signal waveform. Via an npn emitter-follower transistor 87, this signal value is transferred to an output terminal 88, a current source 89 being arranged in the emitter circuit of the transistor 87.

However, if a steep signal transition and consequently a positive pulse appears on the transistor 72, the transistors 35 and 36 are cut off as described above. The transistor 87 is then driven only by the voltage across the capacitor 86, and the output signal, as is shown in FIG. 2c, keeps the value existing before the beginning of the intervalt for the duration of the transition interval (t' in FIG. 2a).

At the end of the interval, the drive pulse for the transistor 72 ceases. As the voltage on the base of the transistor 51 has increased slightly as a result of the charge across the capacitor 81, the threshold of equal currents in the transistors 51 and 52 is advanced and is passed more steeply than at the end of the drive pulse: in this way the change-over to render the output stage 35 operative is accelerated. As a result of the time constant, which is low owing to the properties of the present circuit arrangement, the voltage across the capacitor 86 almost instantaneously assumes the value occurring at the end of the transition interval (see N in FIG. 2a), as is indicated by the steep edges P3 and Q3 in FIG. 2d.

From the source +U, the collector current of the transistor 87 flows through an npn transistor 91 and a 640-ohm resistor 92. The resistor 92 limits the current in the event of a short-circuit of terminal 88 to preclude consequent damage. The base of the transistor 91 is connected to the base of a double pnp transistor 93, whose emitter is connected to +U. One collector of the transistor 93 is connected to the base of the transistor 91 and supplies the base current for the transistor 91. The second collector of the transistor 93 also supplies current to the base of the transistor 87 when the transistors 35 and 36 are cut off. Since the collector-emitter currents of the transistors 91 and 87 are equal, their base currents—in the case of identical transistor types—are also equal and are maintained equal by the transistor 93. This ensures that also in the case that the transistors 35 and 36 are cut off, the transistor 87 receives the required base current and this current is not drained from the capacitor 86. With respect to the capacitor 86, the circuit therefore has a very high impedance, so that this capacitor can be very small for a specific time constant.

From a circuit point 96, a similarly formed signal is applied to the emitters of the transistors 67 and 68 in a circuit for a further color signal, for example the blue color-difference signal (B-Y), in such a way that the instantaneously obtaining color-change signal constitutes the switching signal and turns off the output amplifier 35, 36. Thus, depending on which color signal contains an amplitude step, the color values in both color-signal channels are maintained and a steeper transition is produced.

In parallel with the color signals, the luminance signal is applied in the usual manner from a terminal 101 to an output 104 via an amplifier 102 and a delay line 103 and is then transferred to a matrix circuit. In a circuit arrangement in accordance with the invention, the delay in the stage 103 is increased in conformity with the width of the transition interval t' (see FIG. 2a), so that a steeper luminance step and a chroma-amplitude step enhanced in accordance with the invention will appear substantially at the same time in the reproduced picture.

What is claimed is:

1. A circuit arrangement for enhancing the sharpness of edges in a video signal, in particular a chroma signal or a color-difference signal, in which an input of the circuit arrangement is coupled to an output of the circuit arrangement by at least one switch and in which the input is coupled to switching-signal generating means for the generation of a switching signal for the actuation of the switch, so that during the occurrence of edges the coupling between the input and the output is interrupted by the switch, the circuit arrangement comprising a memory for the amplitude of the video signal at the beginning of an edge, characterized in that that the memory is coupled permanently to the output.

2. A circuit arrangement as claimed in claim 1, characterized in that for obtaining the switching signal, the switching signal generating means comprises a differentiation stage for differentiating the video signal, a rectifier stage coupled to the differentiation stage, and a clipping stage coupled to said rectifier stage for transferring only approximately maximum values for generating the switching signal.

3. A circuit arrangment as claimed in claim 2, characterized in that a modifying signal is derived from at least one further video signal by differentiation and is passed through a clipping stage which transfers only substantially maximum values, and the clipped modifying signals derived from different video signals are combined in a combining stage, which supplies the switching signal when at least one of the video signals exhibits a transition of maximum steepness.

4. A circuit arrangement as claimed in claim 2 or 3, characterized in that the video signal is applied to the inputs of a differential amplifier both directly and via an integration network, whose two oppositely directed output signals are each applied to a rectifier which combines their portions which are similarly oriented, so that independently of the direction of the variation, a signal is obtained which is proportional to the magnitude of the variation, the integration time constant being smaller than the transition-interval width.

5. A circuit arrangement as claimed in claim 1, 2 or 3, characterized in that the switching signal is applied to the inputs of a differential amplifier both directly and via an integration network, the switch being controlled by the output signal of said integration network and the integration time constant being of the order of magnitude of the transition-interval width.

6. A circuit arrangement as claimed in claim 4, characterized in that the switching signal is applied to the inputs of a differential amplifier both directly and via an integration network, the switch being controlled by the output signal of said integration network and the integration time constant being of the order of magnitude of the transition-interval width.

* * * * *